(12) United States Patent
Ciccarella et al.

(10) Patent No.: US 8,329,139 B2
(45) Date of Patent: Dec. 11, 2012

(54) PROCESS FOR THE PREPARATION OF TITANIUM DIOXIDE WITH NANOMETRIC DIMENSIONS AND CONTROLLED SHAPE

(75) Inventors: Giuseppe Ciccarella, Lecce (IT); Roberto Cingolani, Lecce (IT); Luisa De Marco, Casarano (IT); Giuseppe Gigli, Rome (IT); Giovanna Melcarne, Gagliano de Capo (IT); Francesca Martina, Galugnano (IT); Francesco Matteucci, Ravenna (IT); Jolanda Spadavecchia, Taranto (IT)

(73) Assignee: Daunia Solar Cell, S.r.l., Foggia (IT)

(*) Notice: Subject to any disclaimer, the term of this patent is extended or adjusted under 35 U.S.C. 154(b) by 132 days.

(21) Appl. No.: 12/866,366

(22) PCT Filed: Feb. 11, 2008

(86) PCT No.: PCT/IT2008/000082
§ 371 (c)(1),
(2), (4) Date: Aug. 5, 2010

(87) PCT Pub. No.: WO2009/101640
PCT Pub. Date: Aug. 20, 2009

(65) Prior Publication Data
US 2010/0316561 A1 Dec. 16, 2010

(51) Int. Cl.
*C01G 23/047* (2006.01)
(52) U.S. Cl. .................................... 423/610; 977/762
(58) Field of Classification Search .......... 423/610–616; 977/762
See application file for complete search history.

(56) References Cited

U.S. PATENT DOCUMENTS
2006/0104894 A1  5/2006  Daoud et al.

OTHER PUBLICATIONS

Zhong et al., "Synthesis of One-Dimentional and Porous TiO2 Nanostructures by Controlled Hydrolysis of Titanium Alkoxide via Coupling with an Esterification Reaction", Chem. Mater. 2005, 17, 6814-6818.*
Wang et al., "The Synthesis of Nanocrystalline Anatase and Rutile Titania in Mixed Organic Media", Inorg. Chem. 2001, 40, 5210-5214.*
Parra, et al., "Reaction pathway to the synthesis of anatase via the chemical modification of titanium isopropoxide with acetic acid", Chemistry of Materials, vol. 20, No. 1, Jan. 8, 2008, pp. 143-150.
Yoshida, et al., "Syntheses of TiO2(B) nanowires and TiO2 anatase nanowires by hydrotherma l and post-heat treatments", Journal of Solid State Chemistry, vol. 178, No. 7, Jul. 1, 2005, pp. 2179-2185.
Miao, et al., "Fabrication, characterization and Raman study of anatase-TiO2 nanorods by a heating-sol-gel template process", Journal of Crystal Growth, Elsevier, vol. 264, No. 1-3, Mar. 15, 2004, pp. 246-252.

* cited by examiner

*Primary Examiner* — Colleen Dunn
*Assistant Examiner* — Anthony J Zimmer
(74) *Attorney, Agent, or Firm* — Lucas & Mercanti, LLP

(57) ABSTRACT

The present invention relates to an industrial applicable process for the preparation of materials with nanometric dimensions and controlled shape, based on titanium dioxide. The invention also relates to a process for the preparation of titanium dioxide nanorods with anatase phase composition, which are highly suitable for applications involving photovoltaic cells, particularly Dye Sensitized Solar Cells (DSSC), photoelectrolysis cells and tandem cells for the conversion of solar energy and the production of hydrogen.

17 Claims, 10 Drawing Sheets

TEM image of TiO$_2$ produced as per Example 6

Fig. 1a - XRPD of TiO₂ powder produced as per Example 1
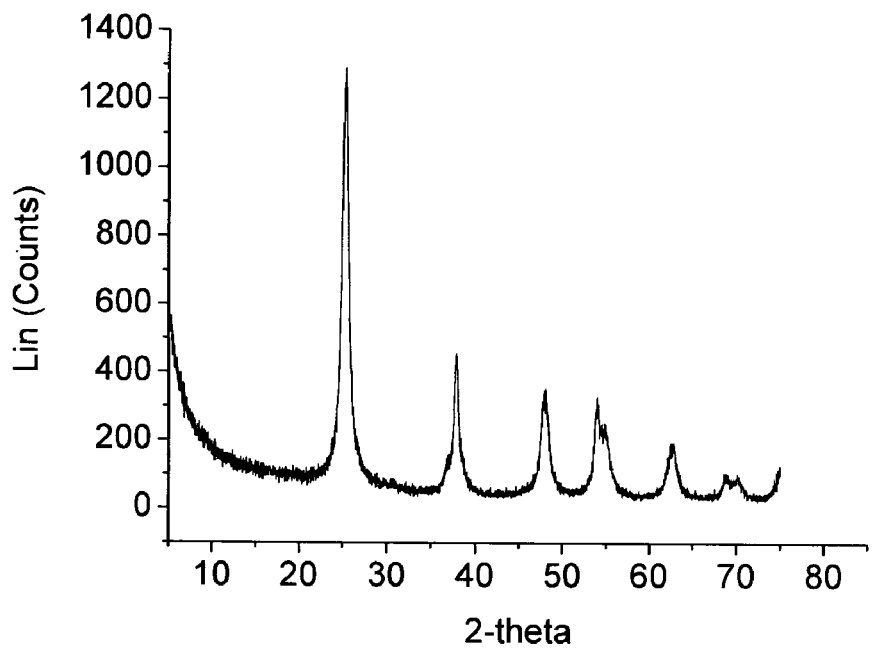
Fig. 1b - TEM image of TiO₂ produced as per Example 1
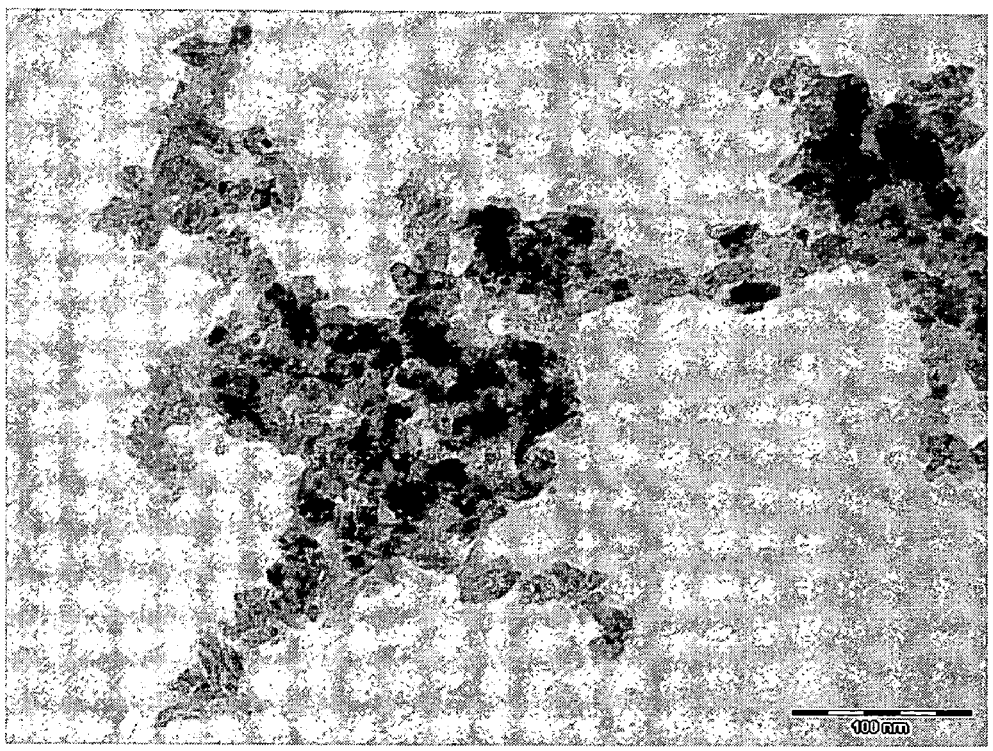

Fig. 2a - XRPD of TiO$_2$ powder produced as per Example 2
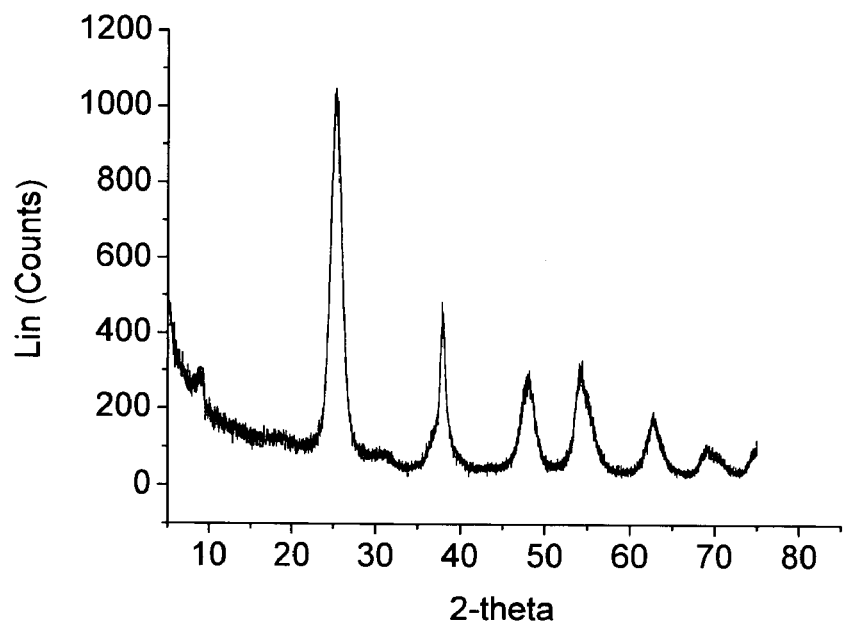
Fig. 2b - TEM image of TiO$_2$ produced as per Example 2

Fig. 3a - XRPD of TiO$_2$ powder produced as per Example 3
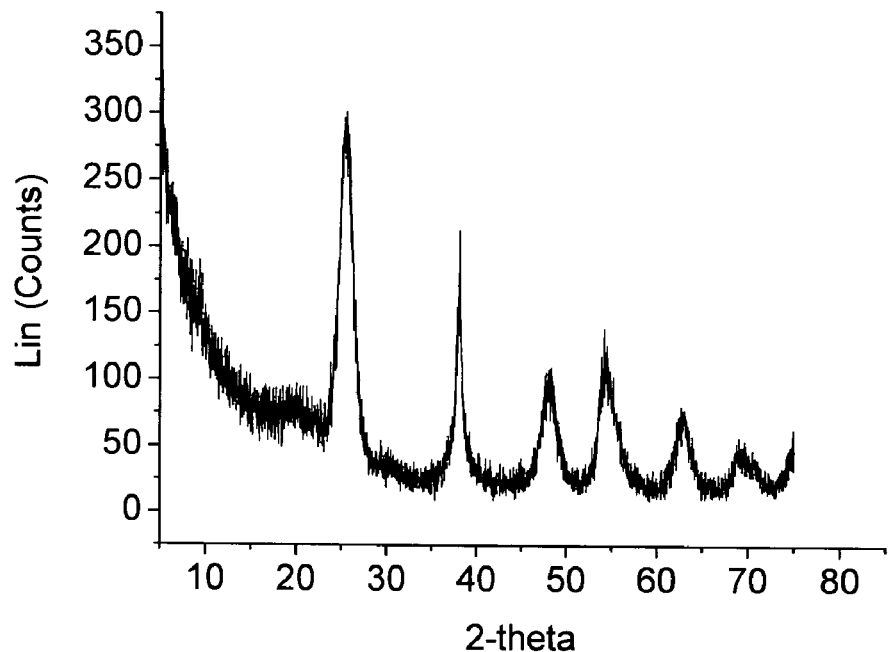
Fig. 3b - TEM image of TiO$_2$ produced as per Example 3
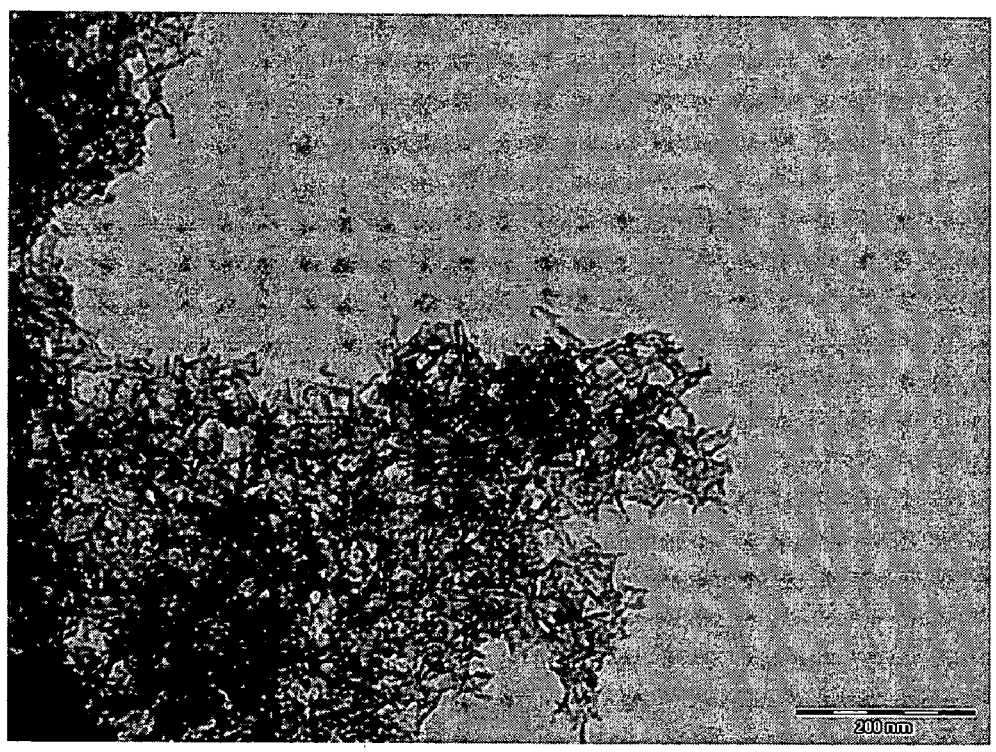

Fig. 4a - XRPD of TiO₂ powder produced as per Example 4
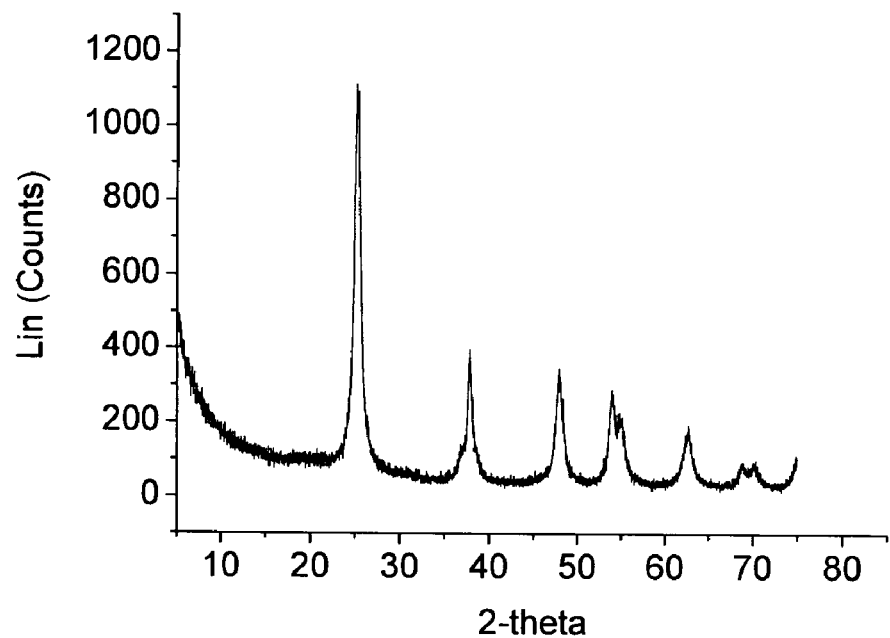
Fig. 4b - TEM image of TiO₂ produced as per Example 4
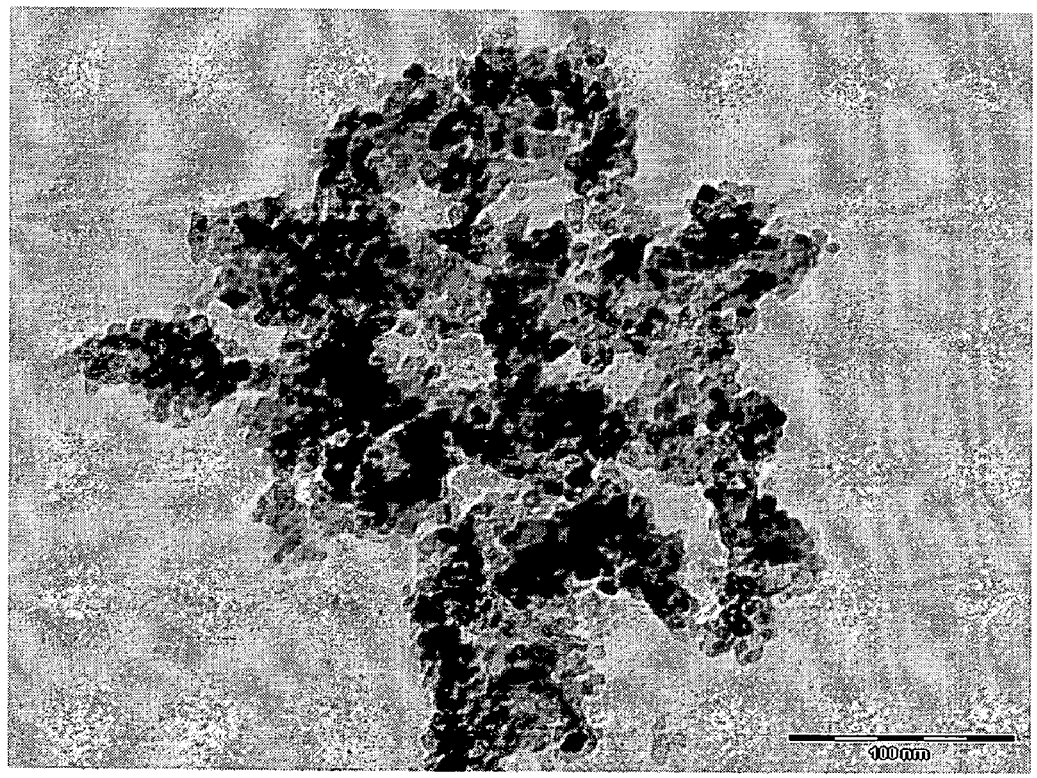

Fig. 5a - XRPD of TiO$_2$ powder produced as per Example 5
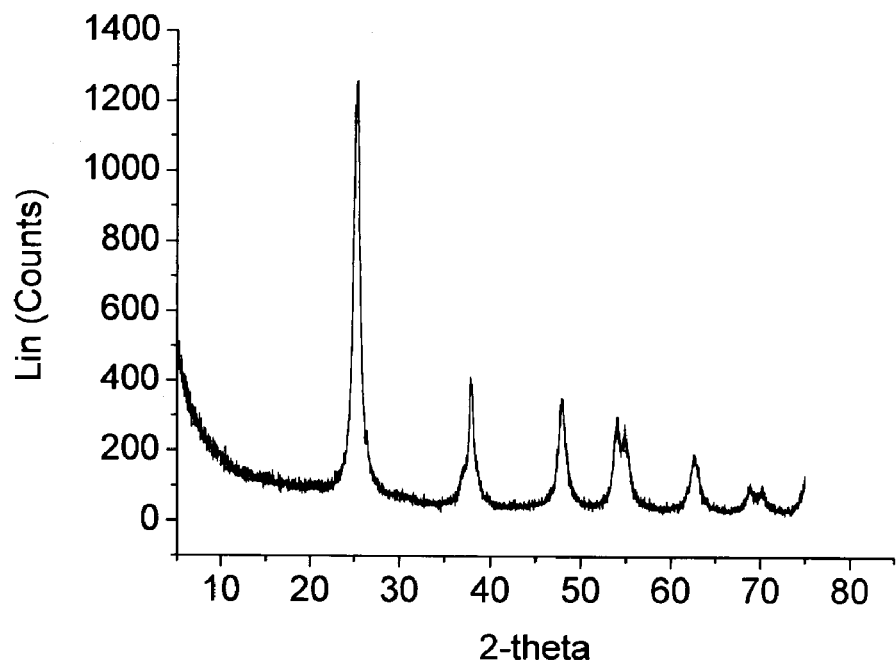
Fig. 5b - TEM image of TiO$_2$ produced as per Example 5
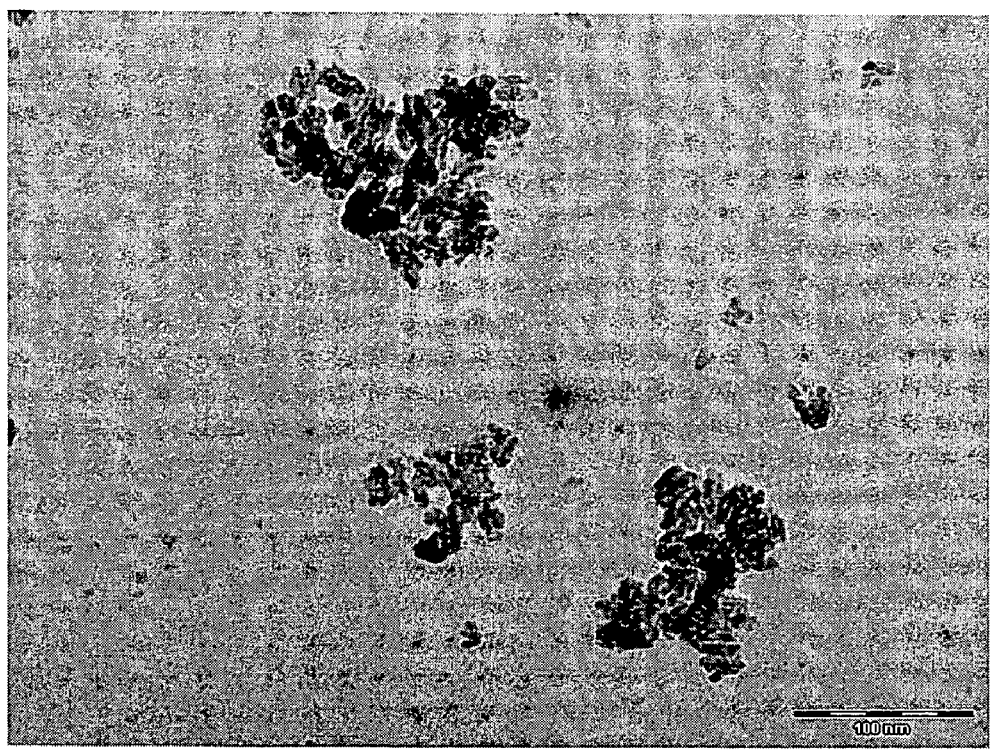

Fig. 6a - XRPD of TiO$_2$ powder produced as per Example 6
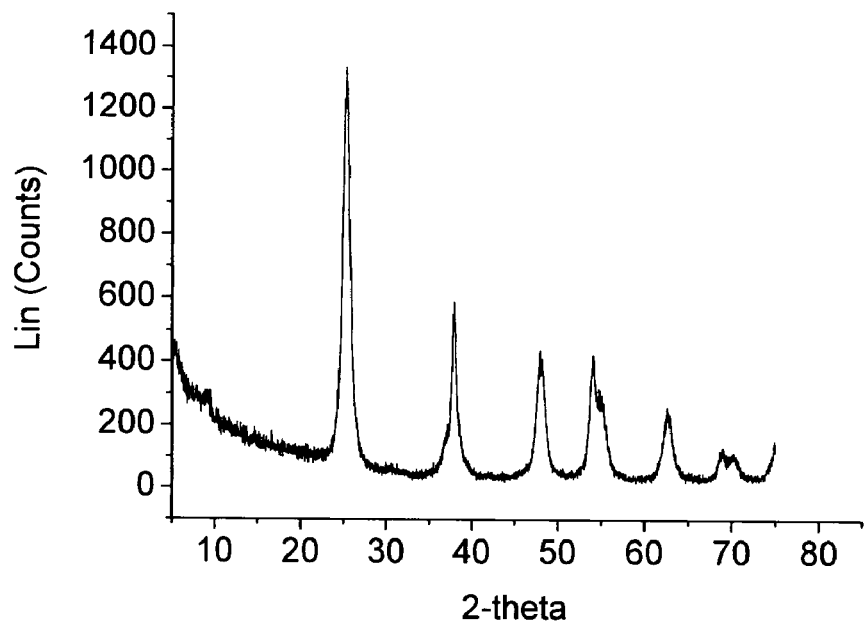
Fig. 6b - TEM image of TiO$_2$ produced as per Example 6
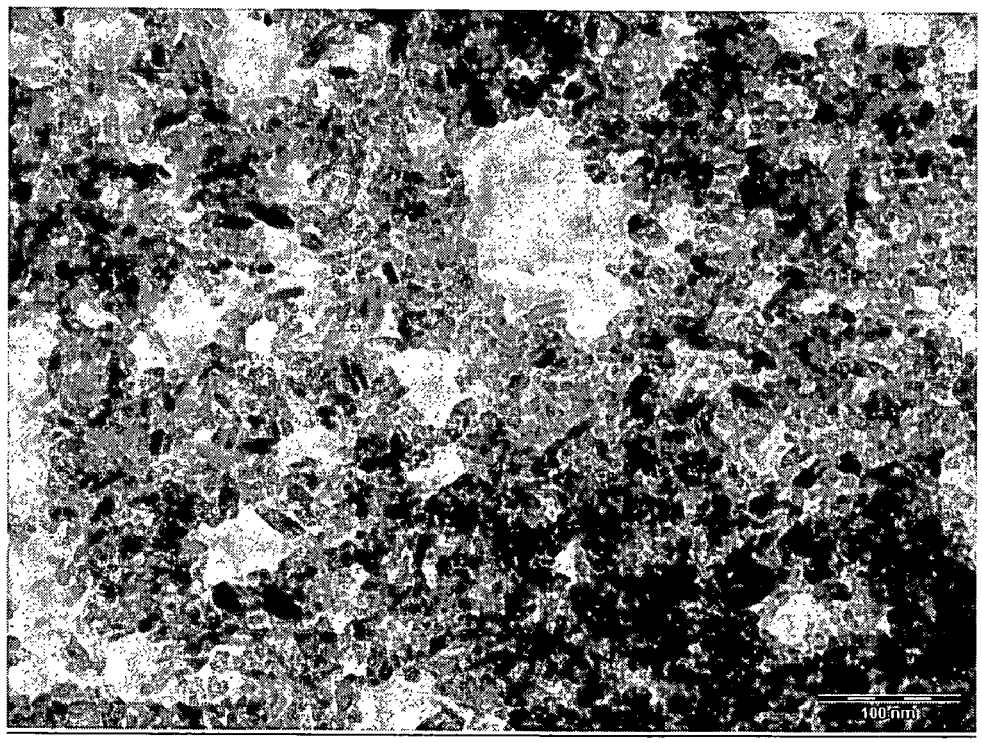

Figure 7a - XRPD of TiO$_2$ powder produced as per Example 7
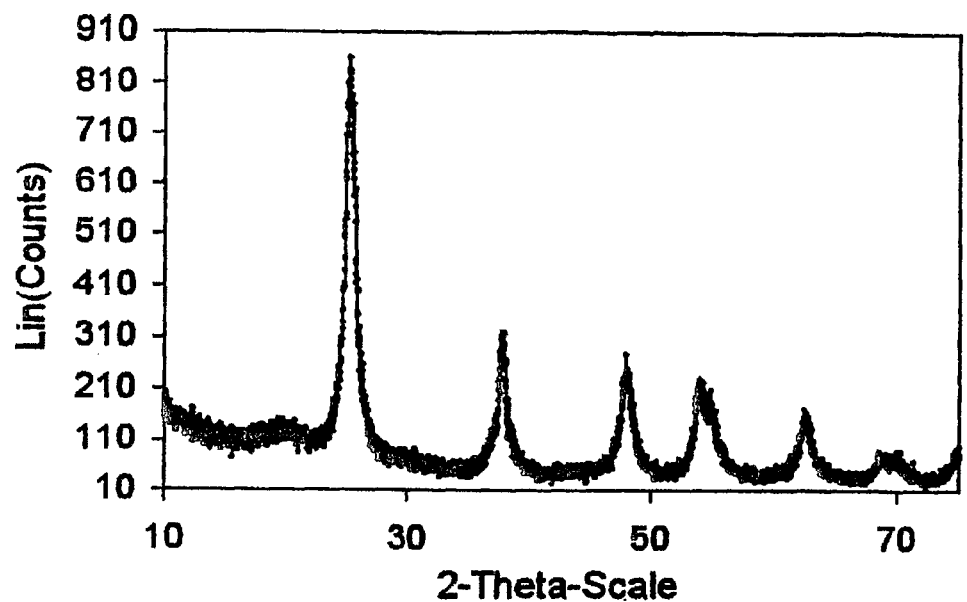
Figure 7b - TEM image of TiO$_2$ produced as per Example 7
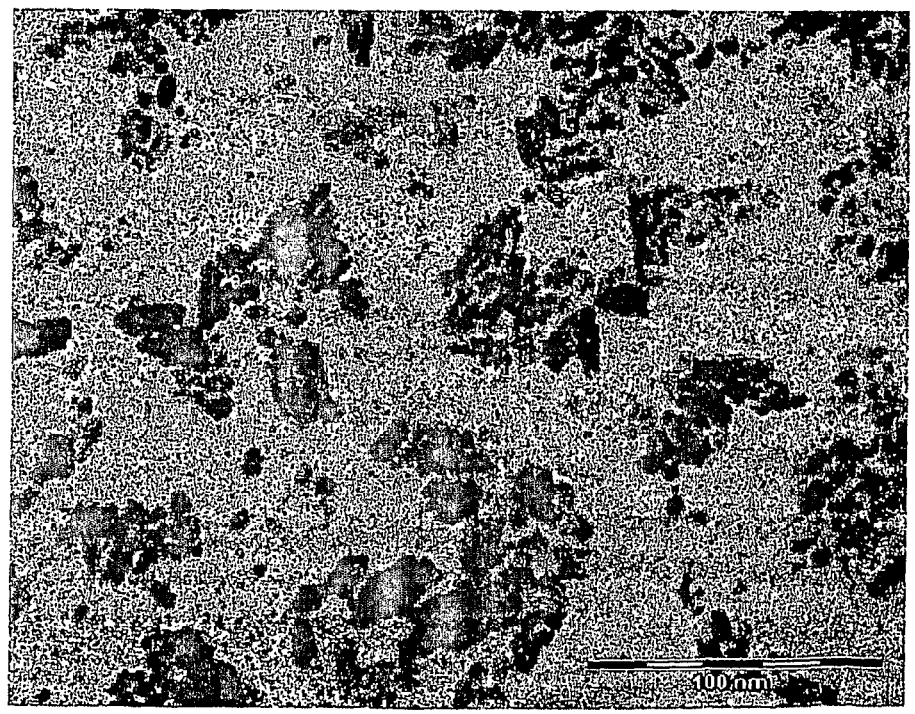

Figure 8a - XRPD of TiO$_2$ powder produced as per Example 8
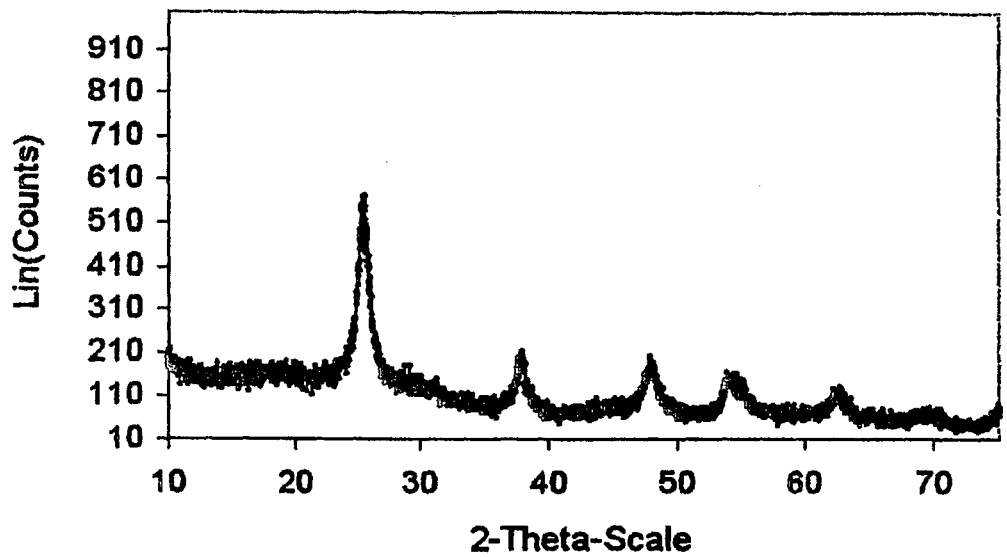
Figure 8b - TEM image of TiO$_2$ produced as per Example 8
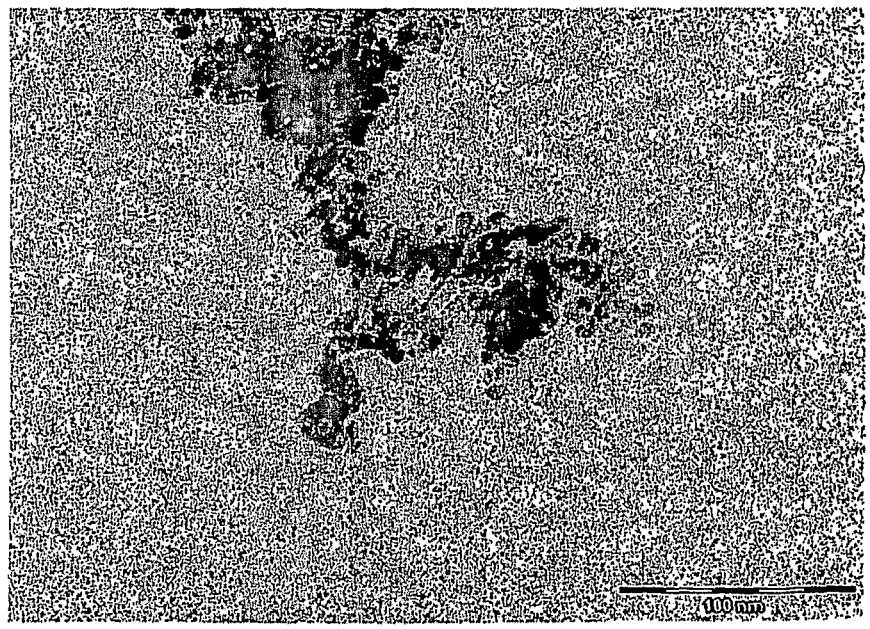

Figure 9a - XRPD of TiO$_2$ powder produced as per Example 9
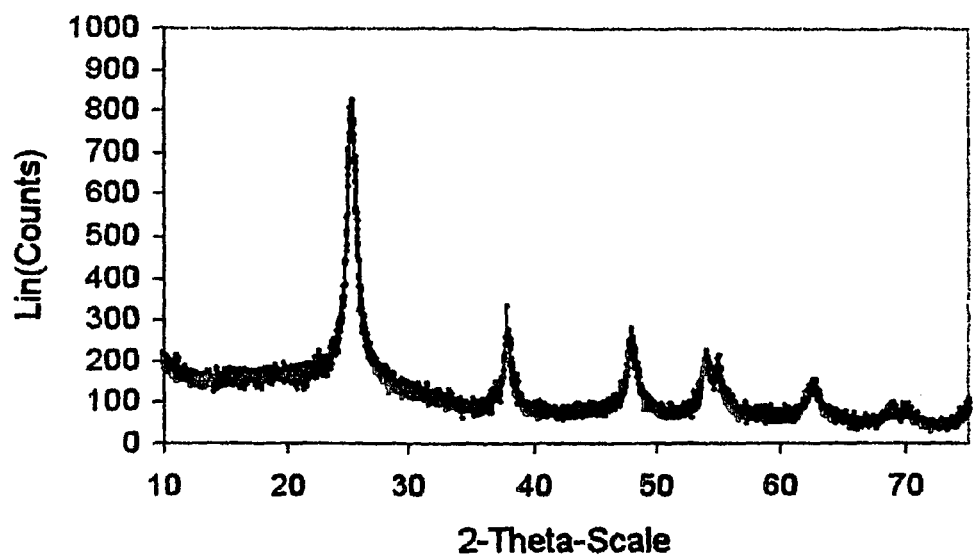
Figure 9b - TEM image of TiO$_2$ produced as per Example 9

Figure 10a - XRPD of TiO$_2$ powder produced as per Example 10
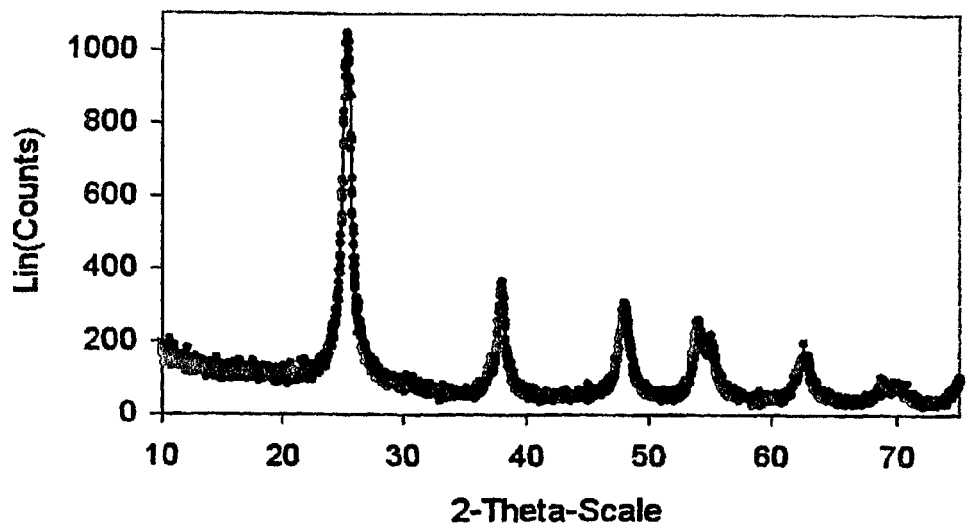
Figure 10b - TEM image of TiO$_2$ produced as per Example 10
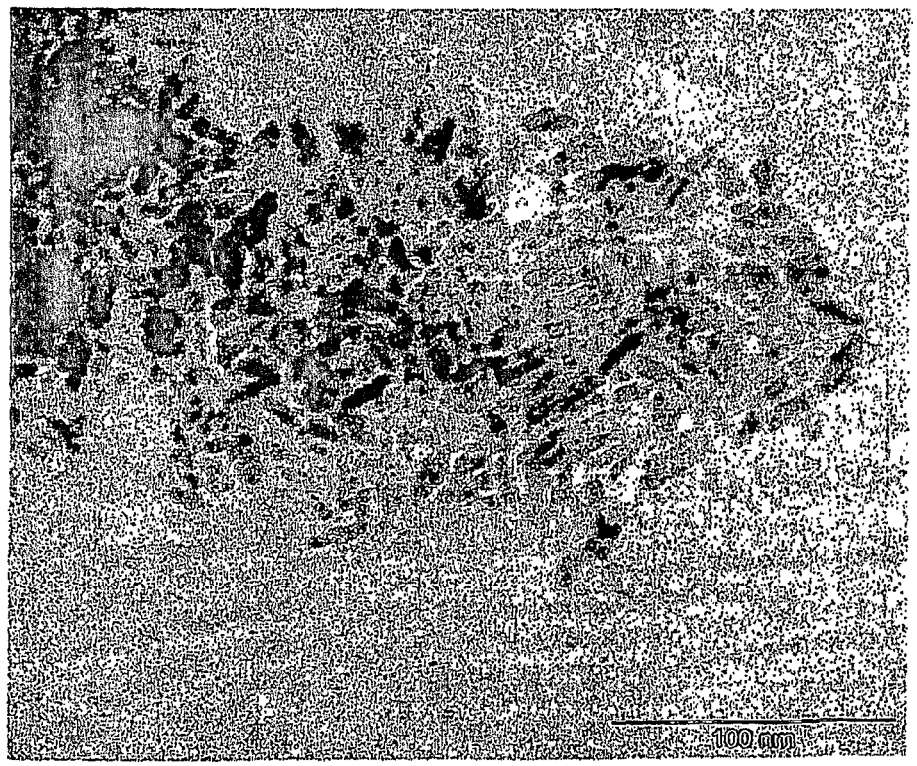

PROCESS FOR THE PREPARATION OF TITANIUM DIOXIDE WITH NANOMETRIC DIMENSIONS AND CONTROLLED SHAPE

CROSS-REFERENCE TO RELATED APPLICATIONS

This application is a 371 of PCT/IT2008/000082 filed Feb. 11, 2008, the contents of which are incorporated herein by reference.

FIELD OF THE INVENTION

The present invention relates to an industrial applicable process for the preparation of materials with nanometric dimensions and controlled shape, based on titanium dioxide. The invention also relates to a process for the preparation of titanium dioxide nanorods with anatase phase composition, which are highly suitable for applications involving photovoltaic cells, particularly Dye Sensitized Solar Cells (DSSC), photoelectrolysis cells and tandem cells for the conversion of solar energy and the production of hydrogen.

BACKGROUND OF THE INVENTION

Titanium dioxide ($TiO_2$) is one of the most important metal oxides in industrial applications, since it is used in an array of different sectors, ranging from paper production to pharmaceuticals, cosmetics, photocatalysers, photovoltaic cells, photoelectric cells, sensors, inks, coatings, coverings and plastic, and even encompassing the photocatalysis of organic pollutants. In particular, certain types of $TiO_2$ are especially suitable for applications involving photovoltaic cells, particularly Dye Sensitized Solar Cells (DSSC), photoelectrolysis cells and tandem cells for the conversion of solar energy and the production of hydrogen.

$TiO_2$ has various crystalline shape. The most common crystalline phases of $TiO_2$, anatase, rutile and brookite, exhibit different chemical/physical properties, such as stability field, refraction indexes, chemical reactivities and behaviour to irradiation with electromagnetic radiation. The use and performance of $TiO_2$ depends greatly on its crystalline phase, on its morphology and on the dimensions of the particles, as reported, for instance, by X. Chen and S. S. Mao in J. Nanosci. Nanotechnol, 6(4), 906-925, 2006. The phase composition, the shape of the crystals and the dimensions of the particles exert an enormous influence Over the chemical/physical, mechanical, electronic, magnetic and optical properties of the end product.

In terms of their dimensions, particles with nanometric dimensions have electrical, thermal, magnetic and optical properties that differ from those of larger particles. $TiO_2$ particles with nanometric dimensions, particularly those with a diameter of between 1 and 20 nanometres, have properties similar to those of molecules, in that they exhibit effects of quantisation and unusual luminescence (X. Chen and S. S. Mao, Chem. Rev., 107, 2891-2959, 2007).

Anatase-phase crystalline $TiO_2$ is an oxide that is widely used as a photocatalyser, as a white pigment for coatings and cosmetic products, and in various types of sensors.

The most recent, and most important, uses of anatase $TiO_2$ with nanometric dimensions concern applications involving photovoltaic cells, particularly DSSC, photoelectrolysis cells and tandem cells for the conversion of solar energy and the production of hydrogen.

Based on studies conducted on the specific application of $TiO_2$ in DSSC cells (X. Chen and S. S. Mao, Chem. Rev., 107, 2891-2959, 2007 and J. Nanosci. Nanotechnol, 6(4), 906-925, 2006), it has been demonstrated that the most preferred shape is anatase crystalline nanorods.

Of late, the synthesis of controlled shape nanomaterials based on $TiO_2$ has become the subject of much intense research, and new synthetic methods have been developed that allow the phase composition, morphology and dimensions of the particles to be controlled (X. Chen e S. S. Mao, J. Nanosci. Nanotechnol, 6(4), 906-925, 2006).

The main methods for producing nanorods for industrial use are:
 a) hydrothermal synthesis;
 b) solvothermal synthesis;
 c) sol-gel synthesis.

Hydrothermal syntheses, method a), use aqueous solutions containing titanium tetrachloride, generally in the presence of acids, inorganic salts and surfactants, at temperatures of up to 160° C. (X. Feng et al., Angew. Chem. Int. Ed., 44, 5115-5118, 2005; S. Yang and L. Gao, Chem. Lett. 34, 964-5, 2005; ibid. 34, 972-3, 2005; ibid. 34, 1044-5, 2005). Preferably, it is the rutile phase that is obtained, making these methods unsuitable for the formation of anatase.

Solvothermal synthesis, method b), (C. S. Kim et al., J. Cryst. Growth, 257, 309-15, 2003) makes it possible to obtain nanosized rods with anatase phase composition. These reactions are conducted in autoclave, mostly under anhydrous conditions, at high temperatures of around 250° C., for long periods, using an aromatic solvent, such as toluene, and in the presence of an organic acid such as oleic acid, which also functions as a surfactant. The titanium/solvent/surfactant ratio of the reagents exerts a strong influence over the dimensions of the nanorods, making it a laborious process to reach the desired result. Moreover, the requirement for prolonged thermal treatment makes this method of synthesis an expensive option.

High-temperature reactions using benzyl alcohol as a solvent, and in the absence of acidity (A. P. Caricato et al., Appl. Surf Sci. 253, 6471-6475, 2007), enable the production of particles that are mostly spherical, albeit under rather drastic reaction conditions.

Sol-gel synthesis, method c), involves the controlled hydrolysis of titanium alkoxide with water, in the presence of fatty organic acids, such as oleic acid, which serves as a surfactant and stabilising agent, and catalysts such as amine or quaternary ammonium salts (Cozzoli, P. D., Kornowski, A., Weller, H. J., J. Am. Chem. Soc., 125, 14539-14548, 2003). These reactions occur under relatively mild conditions and afford control over the dimensions of the crystalline-shape particles, but the $TiO_2$ particles obtained are polluted by organic products, rendering them unsuitable for certain applications. The purification of these particles requires, therefore, a prolonged post-treatment calcination process, which, in addition to being costly, could significantly modify the characteristics of the end product, which may not match the requested characteristics.

R. Parra et al., in Chem. Mater, 20, 143-150, 2008, describe the combined use of organic acids with low molecular weight, such as acetic acid, and 2-propanol as a solvent, in the absence of surfactants, to produce anatase-phase $TiO_2$ from titanium tetraisopropoxide. However, this process makes it possible to produce only agglomerates, and not nanorods.

The patent application US 20060104894 describes the production of nanocrystals of anatase $TiO_2$ through the reaction of a titanium precursor and an organic acid, in the presence of an acidic catalyst (e.g. nitric acid) or a basic catalyst, in a solvent including water and alcohols with low molecular weight, heating the resultant solution to 50±15° C. However, no mention is made in this patent application of the shape of the product obtained using this process.

According to patent application US 20060034752, it is possible, through the reaction of a titanium precursor, in the presence of an acid (nitric acid, hydrochloric acid, acetic acid or oxalic acid), in water and alcohols with low molecular weight to produce a hydroxide of titanium that, only after calcination, transforms itself into $TiO_2$, but does so with a mixed-phase anatase/brookite composition.

According to the patent application WO 2007028972, it is possible, through the reaction of an alkoxide of titanium in ethanol or acetone and benzyl alcohol in the presence of water or acetic acid, and only after calcination at 400° C., to produce anatase-phase $TiO_2$, which is subsequently transformed into rutile-phase $TiO_2$ through heating to a temperature between 650° and 950° C.

Water and polyols are used in the patent application WO 2006061367, but this process is not suitable for producing anatase-phase $TiO_2$ nanorods.

In the patent JP 2003267705 on the production of materials coated with a metal oxide, particularly zinc oxide, where the material to be coated is immersed in the reaction mixture, reference is made to the use of acetic acid, benzyl alcohol and titanium n-butoxide as reactants, but no information is provided on the shape of the titanium dioxide obtained, which, in any case, is not isolated as such; rather, it is produced only in the form of a coating for another material.

The optimum solution for the low-cost, industrial-scale production of anatase-phase $TiO_2$ particles with nanometric dimensions and controlled shape, which are highly suitable for applications involving photovoltaic cells, particularly DSSC, photoelectrolysis cells and tandem cells for the conversion of solar energy and the production of hydrogen, has yet to become available. There is, then, a need for a process whereby it is possible to produce nanocrystalline, anatase-phase $TiO_2$ particles with controlled shape.

SUMMARY OF THE INVENTION

The present invention relates to a new process for the preparation of nanocrystalline $TiO_2$ particles with controlled dimensions and shape, an anatase-phase composition, through the controlled hydrolysis of a titanium precursor by means of a reaction between an alcohol and a carboxylic acid.

In one embodiment, the invention provides a process for the preparation of nanocrystalline $TiO_2$ particles with controlled dimensions and shape, an anatase-phase composition, and a nanorod content of >50%, comprising the reaction of a titanium precursor with an alcohol and an organic acid.

In another embodiment, the invention provides nanocrystalline particles of $TiO_2$, made by the process according to the present invention, with an anatase-phase content of $\geq 95\%$, preferably $\geq 98\%$, and with control over their dimensions. The nanocrystalline $TiO_2$ particles made by the process according to the present invention are:
$\leq 30$ nm long, preferably $\leq 20$ nm;
$\leq 5$ nm wide, preferably $\leq 4$ nm.

The particles in question come predominantly in the shape of nanorods, where "predominantly" is taken to mean >50%, preferably >75%, most preferably >80%.

In another embodiment, the invention provides the use of the nanocrystalline $TiO_2$ particles, made by the process according to the present invention, as photocatalysers, sensors, semi-conductors, pigments, excipients and colourants.

In another embodiment, the invention provides the use of the nanocrystalline $TiO_2$ particles, made by the process according to the present invention, for applications in the fields of photovoltaic cells, preferably DSSC, photoelectrolysis cells and tandem cells for the conversion of solar energy and the production of hydrogen.

The present invention can be characterised as a simple, economical method that produces highly replicable results, easily to scale industrially and affords the opportunity to control the morphology and dimensions of nanometric, anatase-phase $TiO_2$ particles in a single step.

The product directly obtained with the process of the present invention, without recourse to any subsequent treatment, has high anatase content, nanocrystalline-scale particle dimensions and a predominant shape. The capacity to obtain $TiO_2$ with high anatase content, nanocrystalline-scale particles and a predominant shape in a single step also reduces production overheads. Moreover, the new method of preparation is carried out in the absence of surfactants, additional templants or other additives, thus reducing the possibility for the occurrence of a number of problems, such as unwanted reactions, phase precipitations or separations, presence of organic impurities.

BRIEF DESCRIPTION OF THE FIGURES

FIG. 1a shown an XRPD of $TiO_2$ powder produced as per Example 1;
FIG. 1b shows a TEM image of $TiO_2$ produced as per Example 1;
FIG. 2a shows an XRPD of $TiO_2$ powder produced as per Example 2;
FIG. 2b shows a TEM image of $TiO_2$ produced as per Example 2;
FIG. 3a shows an XRPD of $TiO_2$ powder produced as per Example 3;
FIG. 3b shows a TEM image of $TiO_2$ produced as per Example 3;
FIG. 4a shows an XRPD of $TiO_2$ powder produced as per Example 4;
FIG. 4b shows a TEM image of $TiO_2$ produced as per Example 4;
FIG. 5a shows an XRPD of $TiO_2$ powder produced as per Example 5;
FIG. 5b shows a TEM image of $TiO_2$ produced as per Example 5;
FIG. 6a shows an XRPD of $TiO_2$ powder produced as per Example 6;
FIG. 6b shows a TEM image of $TiO_2$ produced as per Example 6;
FIG. 7a shows an XRPD of $TiO_2$ powder produced as per Example 7;
FIG. 7b shows a TEM image of $TiO_2$ produced as per Example 7;
FIG. 8a shows an XRPD of $TiO_2$ powder produced as per Example 8;
FIG. 8b shows a TEM image of $TiO_2$ produced as per Example 8;
FIG. 9a shows an XRPD of $TiO_2$ powder produced as per Example 9;
FIG. 9b shows a TEM image of $TiO_2$ produced as per Example 9;
FIG. 10a shows an XRPD of $TiO_2$ powder produced as per Example 10;
FIG. 10b shows a TEM image of $TiO_2$ produced as per Example 10.

DETAILED DESCRIPTION OF THE INVENTION

Unless otherwise specified, all of the terms used in this application should be interpreted in accordance with their accepted meanings in common technical language. Other, more specific, definitions for certain terms used in the application are highlighted below and are intended to apply both to the description and to the claims, unless another definition, expressed in different terms, provides a wider definition. The term "nanocrystalline" refers to products whose particles have nanometric dimensions. The term "titanium precursor" refers to inorganic or organic compounds that contains titanium. Non-limiting examples of titanium precursor include for instance: titanium alkoxide, titanium halide, such as titanium tetrachloride, titanylsulphate, titanyl bis(acetylacetonate).

The term "titanium alkoxide" refers to the compound $Ti(OR)_4$, wherein R is a $C_1$-$C_6$ alkyl group, as defined below. Non-limiting examples of titanium alkoxide include for instance: titanium tetramethoxide, titanium tetraethoxide, titanium tetra n-propoxide, titanium tetraisopropoxide, titanium tetra n-butoxide, titanium tetra i-butoxide and the like. Particularly preferred is titanium tetraisopropoxide.

The term "alcohol" refers to an $R_1OH$ compound, or to mixtures of $R_1OH$ compounds, wherein $R_1$ is a linear or branched alkyl; an aryl; an aryl substituted by one or more electron donor groups, such as a $C_1$-$C_4$ alkyl or an alkoxyl containing a $C_1$-$C_4$ alkyl radical; an aryl substituted by one or more halogens; an arylalkyl, possibly substituted on the aryl ring by one or more electron donor groups, such as a $C_1$-$C_4$ alkyl or an alkoxyl containing a $C_1$-$C_4$ alkyl radical. Preferably, $R_1OH$ contains between 6 and 12 carbon atoms. Non-limiting examples of these alcohols include for instance: hexan-1-ol, heptan-1-ol, octan-1-ol, 2-ethylhexan-1-ol, nonan-1-ol, decan-1-ol, undecan-1-ol, dodecan-1-ol, benzyl alcohol, p-methoxybenzyl alcohol and the like, or their mixtures. Particularly preferred are benzyl alcohol, p-methoxybenzyl alcohol, octan-1-ol or 2-ethyl-hexan-1-ol.

The term "organic acid" refers to an $R_2COOH$ compound, or to mixtures of $R_2COOH$ compounds wherein $R_2$ is a linear or branched, saturated or unsaturated alkyl, an aryl or a heteroaryl, said $R_2$ group being substituted by one or more halogen, hydroxyl, alkoxyl, carboxyl, carboalkoxyl, aryl or heteraryl groups, and said acid $R_2COOH$ having between 1 and 18 carbon atoms. If the $R_2COOH$ compound contains two carboxyl groups, it is essential that they are separated from each other by at least 4 carbon atoms. Non-limiting examples of these acids include for instance: acetic acid, pivalic acid, trifluoroacetic acid, benzoic acid, phenylacetic acid, p-methoxybenzoic acid, 4-pyridylcarboxylic acid, oleic acid, adipic acid, and the like or their mixtures. Preferred acids are acetic acid, benzoic acid, oleic acid and adipic acid or their mixtures. Particularly preferred is acetic acid.

The term "$C_1$-$C_4$ alkyl" refers to a saturated, linear or branched aliphatic hydrocarbon chain with between 1 and 4 carbon atoms. Typical alkyl groups include for instance, but are not limited: methyl, ethyl, n-propyl, iso-propyl, n-butyl, sec-butyl, iso-butyl, tert-butyl and the like.

The term "$C_1$-$C_6$ alkyl" refers to a saturated, linear or branched aliphatic hydrocarbon chain with between 1 and 6 carbon atoms, preferably between 1 and 4 carbon atoms. Typical alkyl groups include for instance, but are not limited: methyl, ethyl, n-propyl, iso-propyl, n-butyl, sec-butyl, iso-butyl, tent-butyl, n-pentyl, n-hexyl and the like.

The term "alkoxyl, containing a $C_1$-$C_4$ alkyl radical" refers to ethers containing up to four carbon atoms. Typical alkoxyl groups include for instance, but are not limited: methoxyl, ethoxyl, iso-propoxyl, tert-butoxyl and the like.

The term "aryl" refers to an aromatic radical with between 6 and 10 carbon atoms, either with a single ring (e.g. phenyl) or with multiple condensed rings (e.g. naphthyl).

The term "heteroaryl" refers to a heterocyclic aromatic group with one or more heteroatoms in the ring, chosen from O, S or N. Typical heteroaryl groups include for instance, but are not limited: pyridyl, pyrazinyl, pyrimidinyl, pyridazinyl, thienyl, furyl, imidazolyl, pyrrolyl, oxazolyl (e.g. 1,3-oxazolyl and 1,2-oxazolyl), thiazolil (e.g. 1,2-thiazolil and 1,3-thiazolyl), pyrazolil, triazolyl (e.g. 1,2,3-triazolyl and 1,2,4-triazolyl), oxadiazolyl (e.g. 1,2,3-oxadiazolyl), thiadiazolyl (e.g. 1,3,4-thiadiazolyl), chinolyl, isochinolyl, benzothienyl, benzofuryl, indolyl, benzothiazolyl and the like.

Surprisingly, we found that the reaction of a titanium precursor with an alcohol and an organic acid, in the absence of surfactants or additional templants, makes possible to produce anatase-phase nanocrystalline $TiO_2$ particles, with control over the dimensions and shape of the particles.

The process of the present invention allows for the direct production of nanocrystalline $TiO_2$ particles with an anatase content of $\geq 95\%$, preferably $\geq 98\%$, and with control over their dimensions.

The nanocrystalline $TiO_2$ particles produced by means of the invention process are:
$\leq 30$ nm long, preferably $\leq 20$ nm;
$\leq 5$ nm wide, preferably $\leq 4$ nm.

The particles in question come predominantly in the shape of nanorods, where "predominantly" is taken to mean >50%, preferably >75% and most preferably >80%.

The nanocrystalline $TiO_2$ particles produced by the invention process are characterized using X-Ray Power Diffraction (XRPD) and Transmission Electron Microscopy (TEM).

In one embodiment, the invention provides a process for the preparation of nanocrystalline $TiO_2$ particles, with controlled dimensions and shape, an anatase phase composition and a nanorod content of >50%, comprising the reaction of a titanium precursor with an alcohol and an organic acid.

Preferably, though not exclusively, the titanium precursor is titanium alkoxide, e.g. titanium tetramethoxide, titanium tetraethoxide, titanium tetra n-propoxide, titanium tetraisopropoxide, titanium tetra n-butoxide and titanium tetra i-butoxide. Particularly preferred is titanium tetraisopropoxide.

Preferably, the alcohol should contain between 6 and 12 carbon atoms. Preferred alcohols are: hexan-1-ol, heptan-1-ol, octan-1-ol, 2-etylhexan-1-ol, nonan-1-ol, decan-1-ol, undecan-1-ol, dodecan-1-ol, benzyl alcohol, p-methoxybenzyl alcohol or their mixtures. Particularly preferred are benzyl alcohol, p-methoxybenzyl alcohol, octan-1 -ol or 2-ethyl-hexan-1-ol.

Preferably, the organic acid should contain between 1 and 18 carbon atoms. Preferred acids include: acetic acid, pivalic acid, trifluoroacetic acid, benzoic acid, phenylacetic acid, p-methoxybenzoic acid, 4-pyridylcarboxylic acid, oleic and adipic acid or their mixtures. Particularly preferred acids are: acetic acid, benzoic acid, oleic acid, adipic acid or their mixtures. Most particularly preferred is acetic acid.

The titanium precursor, the alcohol and the acid are mixed together at room temperature. The titanium precursor/alcohol molar ratios should be comprised between 1/8 and 1/20, preferably between 1/9 and 1/15, and most preferably between 1/9.5 and 1/12.

The titanium precursor/acid molar ratios should be comprised between 1/2 and 1/10, preferably between 1/3 and 1/7, and most preferably between 1/3.5 and 1/6.

The reaction mixture is heated, under stirring, to a temperature comprised between 80-200° C., preferably between 90-160° C., and most preferably between 90-140° C., and is then kept within that temperature range for a period comprised between 10 and 30 hours, preferably between 16 and 24 hours, in order to allow for the formation of the product with the desired characteristics.

The reaction mixture is cooled to a temperature of <80° C., preferably <50° C., and mostly preferably 25±15° C.

The processing of the reaction mixture can be carried out in one of the following ways:
a) centrifugation of the product in order to eliminate the supernatant, rinsing of the solid with appropriate organic solvents and drying in an oven, in case at low pressure;
b) concentration of the reaction mixture at low pressure, dilution of the residue with an appropriate organic solvent, filtration, rinsing of the filtrate with the same solvent and drying in an oven, in case at low pressure;
c) use of spray-drying or turbo-drying directly on the mixture at the end of the reaction or in case as an alternative to the drying phase used in methods a) and b).

Non limiting examples of suitable organic solvents include: alcohols, such as methanol, ethanol, n-propanol, i-propanol, n-butanol, i-butanol, sec-butanol; aliphatic ketones, such as acetone, methylethylketone, methylbutylketon, cyclohexanone; aliphatic or cycloaliphatic eters, such as tetrahydrofuran, 2-methyltetrahydrofuran, dioxane, diisopropylether, methyl t-butylether, dimethoxyethane, diethoxyethane, diethylenglycol dimethylether, diethylenglycol diethylether, triethylenglycol dimethylether, triethylenglycol diethylether; chlorinated hydrocarbons, such as dichloromethane, trichloroethylene; aliphatic esters, such as methylformate, ethylformate, methylacetate, ethylacetate, butylacetate, isobutylacetate, ethylpropionate; aliphatic or aromatic hydrocarbons, such as pentane and its mixtures, hexane and its mixtures, heptane and its mixtures, ligroine, petroleum ether, toluene, xylene; aliphatic nitriles, such as acetonitrile, propionitrile; or their mixtures in different ratios.

The nanocrystalline $TiO_2$ particles produced using the present invention remain stable when stored and are highly useful for a number of applications.

In another embodiment, the invention provides the use of nanocrystalline $TiO_2$ particles, made by the process of the present invention, as photocatalysers, sensors, semi-conductors, pigments, excipients and colourants.

In another embodiment, the invention provides the use of nanocrystalline $TiO_2$, made by the process of the present invention, for applications in the fields of photovoltaic cells, preferably DSSC, photoelectrolysis cells and tandem cells for the conversion of solar energy and the production of hydrogen.

While the present invention has been described in terms of its specific embodiments, certain modifications and equivalents will be apparent to those skilled in the art and are included within the scope of the present invention.

In the following, the present invention shall be illustrated by means of some examples, which are not construed to be viewed as limiting the scope of the invention.

The following abbreviations are used below:
hr (hours); XRPD (X-Ray Power Diffraction); TEM (Transmission Electron Microscopy).

X-ray powder diffraction (XRPD) and data analysis are carried by a Bruker D8 Advance diffractometer, 250 mm goniometric radius, Si(Li) solid state detector (SOL-X), Cukα radiation; the collection parameters are:
Tube operating conditions: 40 kV and 30 mA;
Diverging, receiving and detector slits: 2.0, 2.0, 0.2 mm;
2θ range, step-size and counting time per step: 5-75°, 0.02, 2 s;
sample side-loading on aluminium holders.

EXAMPLE 1

Benzyl alcohol (403 g; 3.88 moles), acetic acid (90 g; 1.51 moles) and titanium tetraisopropoxide (106.7 g; 0.375 moles) are mixed together by mechanical stirring, at room temperature, in a 1000 ml flask equipped with a bubble condenser. The mixture is heated to the reflux temperature of around 110° C. After 5 hours, the solution becomes cloudy and tends to thicken gradually. The stirring speed is increased and the mixture left at reflux for around 24 hours. The suspension becomes fluid and displays an intense white colour. The mixture is transferred to a flask and vacuum-concentrated (0.5 mmHg) at a temperature of around 70° C. until a viscous paste is produced. The residue obtained with ethanol, and subsequently with diisopropyl ether, is then filtered and dried at low pressure, yielding $TiO_2$ (26.5 g), characterized by XRPD (FIG. 1a) and TEM (FIG. 1b).
Anatase phase content: 99.98%
Crystal shape: rods
Average crystal size: length 12 nm; width 4.5 nm
Nanorod content: >95%

EXAMPLE 2

Following the same procedure of Example 1, but using benzoic acid (184 g, 1.51 moles) rather than acetic acid, $TiO_2$ is produced, characterized by XRPD (FIG. 2a) and TEM (FIG. 2b).
Anatase phase content: 99.97%
Crystal shape: rods
Average crystal size: length 10.5 nm; width 4.5 nm
Nanorod content: >95%

EXAMPLE 3

Following the same procedure of Example 1, but using oleic acid (76.26 g, 0.27 moles) rather than acetic acid, $TiO_2$ is produced, characterized by XRPD (FIG. 3a) and TEM (FIG. 3b).
Anatase phase content: 100%
Crystal shape: rods
Average crystal size: length 11.2 nm; width 4.4 nm
Nanorod content: >99%

EXAMPLE 4

Octan-1-ol (106.8 g; 0.82 moles), acetic acid (15.6 g; 0.26 moles) and titanium tetraisopropoxide (19.3 g; 0.068 moles) are mixed together by mechanical stirring, at room temperature, in a 250 ml flask equipped with a bubble condenser. The mixture is heated to the reflux temperature of around 110-125° C. After 5 hours, the solution becomes cloudy and tends to thicken gradually. The stirring speed is increased and the mixture left at reflux for around 20 hours. The suspension becomes milky white and the powder deposits a sediment. The mixture is transferred to a flask and vacuum-concentrated (0.5 mmHg) at a temperature of around 70° C. until an off-white powder is obtained. $TiO_2$ is produced (5 g), characterized by XRPD (FIG. 4a) and TEM (FIG. 4b).
Anatase phase content: 99.99%
Crystal shape: rods
Average crystal size: length 11.1 nm; width 4.9 nm
Nanorod content: >85%

EXAMPLE 5

2-ethyl-hexan-1-ol (106.8 g; 0.82 moles), acetic acid (15.6 g; 0.26 moles), titanium tetraisopropoxide (19.3 g; 0.068 moles) are mixed together by mechanical stirring, at room temperature, in a 4-neck 250 ml flask equipped with a bubble condenser. The reaction is heated to the reflux temperature of around 115-125° C. After around 4 hours, the solution turns slightly cloudy and takes on a light blue tinge. The reaction is left at 115° C. for around 20 hours. It is then allowed to cool to room temperature. The suspension becomes milky white and the powder deposits a sediment. The mixture is transferred to a flask and vacuum-concentrated (0.5 mmHg) at a temperature of around 70° C. until a dusty, off-white powder with easily separable aggregates is obtained. $TiO_2$ is produced (5.1 g), characterized by XRPD (FIG. 5a) and TEM (FIG. 5b).
Anatase phase content: 99.98%
Crystal shape: rods
Average crystal size: length 10.3 nm; width 5 nm
Nanorod content: >85%

EXAMPLE 6

Following the same procedure of Example 5, but using 4-methoxybenzyl alcohol (113.3 g; 0.82 moles) rather than benzyl alcohol, $TiO_2$ is produced, characterized by XRPD (FIG. 6a) and TEM (FIG. 6b).
Anatase phase content: 100%
Crystal shape: rods
Average crystal size: length 15.4 nm; width 4.8 nm
Nanorod content: >95%

EXAMPLE 7

Following the same procedure of Example 5, but using dodecan-1-ol (129.8 g; 0.83 moles) in place of benzyl alcohol, $TiO_2$ is produced, characterized by XRPD (FIG. 7a) and TEM (FIG. 7b).
Anatase phase content: 100%
Crystal shape: rods
Average crystal size: length 17.3 nm; width 4.9 nm
Nanorod content: >70%

EXAMPLE 8

Benzyl alcohol (403 g; 3.88 moles), acetic acid (90 g; 1.51 moles) and titanium tetramethoxide (64.5 g; 0.375 moles) are mixed together by mechanical stirring, at room temperature, in a 1000 ml flask equipped with a bubble condenser. The mixture is heated to the reflux temperature of around 100° C. After 5 hours, the solution becomes cloudy and tends to thicken gradually. The stirring speed is increased and the mixture left at reflux for around 24 hours. The suspension becomes fluid and displays an intense white colour. The mixture is transferred to a flask and vacuum-concentrated (0.5 mmHg) at a temperature of around 70° C. until a viscous paste is produced. The residue obtained with ethanol, and subsequently with diisopropyl ether, is then filtered and dried at low pressure, yielding $TiO_2$ (26.5 g), characterized by XRPD (FIG. 8a) and TEM (FIG. 8b).
Anatase phase content: 100%
Crystal shape: rods
Average crystal size: length 14 nm; width 4.8 nm
Nanorod content: >95%

EXAMPLE 9

Following the same procedure of Example 1, but using adipic acid (241.8 g; 1.51 moles) in place of acetic acid, $TiO_2$ is produced, characterized by XRPD (FIG. 9a) and TEM (FIG. 9b).
Anatase phase content: 100%
Crystal shape: rods
Average crystal size: length 18 nm; width 4.8 nm
Nanorod content: >90%

EXAMPLE 10

Benzyl alcohol (403 g; 3.88 moles), acetic acid (90 g; 1.51 moles) and titanium tetraisopropoxide (106.7 g; 0.375 moles) are mixed together by mechanical shaking, at room temperature, in a 1000 ml Teflon flask equipped with a bubble coolant. The mixture is heated to the reflow temperature of around 110° C. After 5 hours, the solution becomes cloudy and tends to thicken gradually. The shaking speed is increased and the mixture left at reflow for around 24 hours. The suspension becomes fluid and displays an intense white colour. This suspension is dried at the Mini Spray Dryer B 290 in a completely closed system with the inert loop B-295. $TiO_2$ is produced, characterized by XRPD (FIG. 10a) and TEM (FIG. 10b).
Anatase phase content: 99.98%
Crystal shape: rods
Average crystal size: length 12.4 nm; width 4.7 nm
Nanorod content: >95%

The invention claimed is:

1. Process for the preparation of nanocrystalline $TiO_2$ particles, with controlled dimensions and shape, an anatase phase composition and a nanorod content of >50%, comprising
reacting a titanium precursor with an alcohol and an organic acid,
wherein the length of the nanocrystalline particles is $\leqq 30$ nm and the width of the nanocrystalline particles is $\leqq 5$ nm.

2. Process according to claim 1, wherein the anatase-phase content is $\geqq 95\%$.

3. Process according to claim 1, wherein the nanorod content is >75%.

4. Process according to claim 1, wherein the titanium precursor is a titanium alkoxide.

5. Process according to claim 1, wherein the alcohol contains between 6 and 12 carbon atoms.

6. Process according to claim 1, wherein the organic acid contains between 1 and 18 carbon atoms.

7. Process according to claim 1, wherein the titanium precursor/alcohol molar ratio is between 1/8 and 1/20.

8. Process according to claim 1, wherein the titanium precursor/acid molar ratio is between 1/2 and 1/10.

9. Process according to claim 1, wherein the reaction temperature is between 80-200° C.

10. Process according to claim 4, wherein the titanium alkoxide is selected from the group consisting of: titanium tetramethoxide, titanium tetraethoxide, titanium tetra n-propoxide, titanium tetraisopropoxide, titanium tetra n-butoxide and titanium tetra i-butoxide.

11. Process according to claim 4, wherein the titanium alkoxide is titanium tetraisopropoxide.

12. Process according to claim 5, wherein the alcohol is selected from the group consisting of hexan-1-ol, heptan-1-ol, octan-1-ol, 2-ethyl-hexan-1-ol, nonan-1-ol, decan-1-ol, undecan-1-ol, dodecan-1-ol, benzyl alcohol, p-methoxybenzyl alcohol or their mixtures.

13. Process according to claim 12, wherein the alcohol is selected from the group consisting of benzyl alcohol, p-methoxybenzyl alcohol, octan-1-ol, or 2-ethyl-hexan-1-ol.

14. Process according to claim 11, wherein said organic acid is selected from the group consisting of: acetic acid, pivalic acid, trifluoroacetic acid, benzoic acid, phenylacetic acid, p-methoxybenzoic acid, 4-pyridylcarboxylic acid, oleic acid, adipic acid or their mixtures.

15. Process according to claim 14, wherein the organic acid is selected from the group consisting of acetic acid, benzoic acid, oleic acid, adipic acid or their mixtures.

16. Process for the preparation of nanocrystalline $TiO_2$ particles, with controlled dimensions and shape, an anatase phase composition and a nanorod content of >50%, comprising:

reacting a titanium precursor with an alcohol and an organic acid, wherein the alcohol contains between 6 and 12 carbon atoms.

17. Process for the preparation of nanocrystalline $TiO_2$ particles, with controlled dimensions and shape, an anatase phase composition and a nanorod content of >50%, comprising:

reacting a titanium precursor with an alcohol and an organic acid, wherein the titanium precursor/alcohol molar ratio is between 1/8 and 1/20.

* * * * *